(12) United States Patent
Scaramucci (10) Patent No.: US 9,581,253 B2
(45) Date of Patent: Feb. 28, 2017

(54) VALVE MEMBER FOR A FLOATING BALL VALVE

(71) Applicant: Valve Innovations, LLC, Oklahoma City, OK (US)

(72) Inventor: John P. Scaramucci, Oklahoma City, OK (US)

(73) Assignee: Valve Innovations, LLC, Oklahoma City, OK (US)

(*) Notice: Subject to any disclaimer, the term of this patent is extended or adjusted under 35 U.S.C. 154(b) by 34 days.

(21) Appl. No.: 14/621,097

(22) Filed: Feb. 12, 2015

(65) Prior Publication Data

US 2016/0238142 A1 Aug. 18, 2016

(51) Int. Cl.
*F16K 5/06* (2006.01)
*F16K 27/06* (2006.01)

(52) U.S. Cl.
CPC .......... *F16K 5/0605* (2013.01); *F16K 27/067* (2013.01)

(58) Field of Classification Search
CPC . F16K 5/0605; F16K 5/06; F16K 5/08; F16K 27/067
USPC .................. 251/315.01–315.16; 29/890.131, 29/890.125, 890.129
See application file for complete search history.

(56) References Cited

U.S. PATENT DOCUMENTS

| | | | |
|---|---|---|---|
| 3,246,873 A * | 4/1966 | Johnson | F16K 27/107 251/315.14 |
| 3,339,259 A * | 9/1967 | Johnson | B21D 51/08 251/315.16 |
| 3,463,449 A * | 8/1969 | Eilers | F16K 5/08 251/309 |
| 3,463,450 A * | 8/1969 | Works | F16K 5/0642 251/309 |
| 3,484,079 A | 12/1969 | Reagan | |
| 3,518,742 A * | 7/1970 | Krosoczka | B23P 15/001 228/101 |
| 3,578,289 A | 5/1971 | Thevignot | |
| 3,603,560 A * | 9/1971 | Merrill | F16K 27/067 251/309 |
| 3,689,027 A * | 9/1972 | Wilfred | B21D 51/08 251/315.16 |
| 3,722,856 A * | 3/1973 | Koch | F16K 27/067 251/152 |
| 3,737,145 A | 6/1973 | Heller et al. | |

(Continued)

FOREIGN PATENT DOCUMENTS

EP  1359354 A2 * 11/2003 ............... F16K 5/06
WO  WO 2011015705 A1 * 2/2011 ........... F16K 5/0605

*Primary Examiner* — Kevin Murphy
*Assistant Examiner* — David Colon Morales
(74) *Attorney, Agent, or Firm* — Dunlap Codding, P.C.

(57) ABSTRACT

A valve member including a pair of substantially hemispherical shell components fixed together to form a substantially spherical, hollow shell. The shell has an exterior surface, an interior surface, and two opposing annular openings. The valve member further includes a sleeve having a first end and a second end. The sleeve is positioned between the annular openings of the shell to define a central bore between the annular passages. The sleeve is in contact with and fixed to the shell solely at the first end and the second end thereof in a way that a continuous void is defined between the sleeve and the interior surface of the shell from the first end of sleeve to the second end of the sleeve.

5 Claims, 5 Drawing Sheets (56) References Cited

U.S. PATENT DOCUMENTS

| | | | | |
|---|---|---|---|---|
| 3,770,016 | A | * | 11/1973 | Johnstone ............. F16K 5/0605 137/596 |
| 4,150,810 | A | | 4/1979 | Laignel et al. |
| 4,519,412 | A | * | 5/1985 | Grazioli ................ F16K 5/0673 137/315.19 |
| 4,568,059 | A | * | 2/1986 | Kawase ................ F16K 5/0626 251/315.13 |
| 4,911,408 | A | * | 3/1990 | Kemp ................... F16K 5/0689 251/174 |
| 5,979,873 | A | * | 11/1999 | Wu .......................... B21K 1/02 251/315.16 |
| 5,988,590 | A | | 11/1999 | Shiokawa |
| 6,471,183 | B2 | * | 10/2002 | Roszkowski ......... F16K 27/067 251/315.01 |

\* cited by examiner

VALVE MEMBER FOR A FLOATING BALL VALVE

BACKGROUND

Valves that utilize a valve member in the form of a ball with a passage extending from one side to another have long been known for controlling the flow of fluid. Further, it has long been desired to reduce the cost of manufacturing valve members of this type, particularly valve members of larger sizes.

It has been proposed to form a hollow sphere with a cylindrical sleeve extending through the sphere. By fabricating the valve member as a hollow sphere, the amount of steel used to make the valve member is reduced, thereby reducing manufacturing costs. However, it has been found that the hollow sphere is susceptible to being crushed when exposed to high working pressures. To overcome such susceptibility, reinforcement structures have been added between the cylindrical sleeve and the interior surface of the sphere. The inclusion of the reinforcement structures increases the cost of the valve.

To this end, a need exists for a floating ball valve member that is capable of being used in a medium to high pressure environment, yet is cost effective to manufacture and repair. It is such a valve member that the inventive concepts disclosed herein are directed.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION OF EXEMPLARY EMBODIMENTS

Before explaining at least one embodiment of the inventive concepts in detail, it is to be understood that the inventive concepts disclosed herein are not limited in its application to the details of construction, experiments, exemplary data, and the arrangement of the components set forth in the following description or illustrated in the drawings. The inventive concepts are capable of other embodiments or being practiced or carried out in various ways. Also, it is to be understood that the phraseology and terminology employed herein is for purposes of description and should not be regarded as limiting.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, certain well-known features may not be described in detail to avoid unnecessarily complicating the instant disclosure.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherently present therein.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

The term "and combinations thereof" as used herein refers to all permutations or combinations of the listed items preceding the term. For example, "A, B, C, and combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAAB-CCCC, CBBAAA, CABABB, and so forth. A person of ordinary skill in the art will understand that typically there is no limit on the number of items or terms in any combination, unless otherwise apparent from the context.

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

The use of the terms "at least one" and "one or more" will be understood to include one as well as any quantity more than one, including but not limited to each of, 2, 3, 4, 5, 10, 15, 20, 30, 40, 50, 100, and all integers and fractions, if applicable, therebetween. The terms "at least one" and "one or more" may extend up to 100 or 1000 or more, depending on the term to which it is attached; in addition, the quantities of 100/1000 are not to be considered limiting, as higher limits may also produce satisfactory results.

Further, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein qualifiers such as "about," "approximately," and "substantially" are intended to signify that the item being qualified is not limited to the exact value specified, but includes some slight variations or deviations therefrom, caused by measuring error, manufacturing tolerances, stress exerted on various parts, wear and tear, and combinations thereof, for example.

Figure 1:
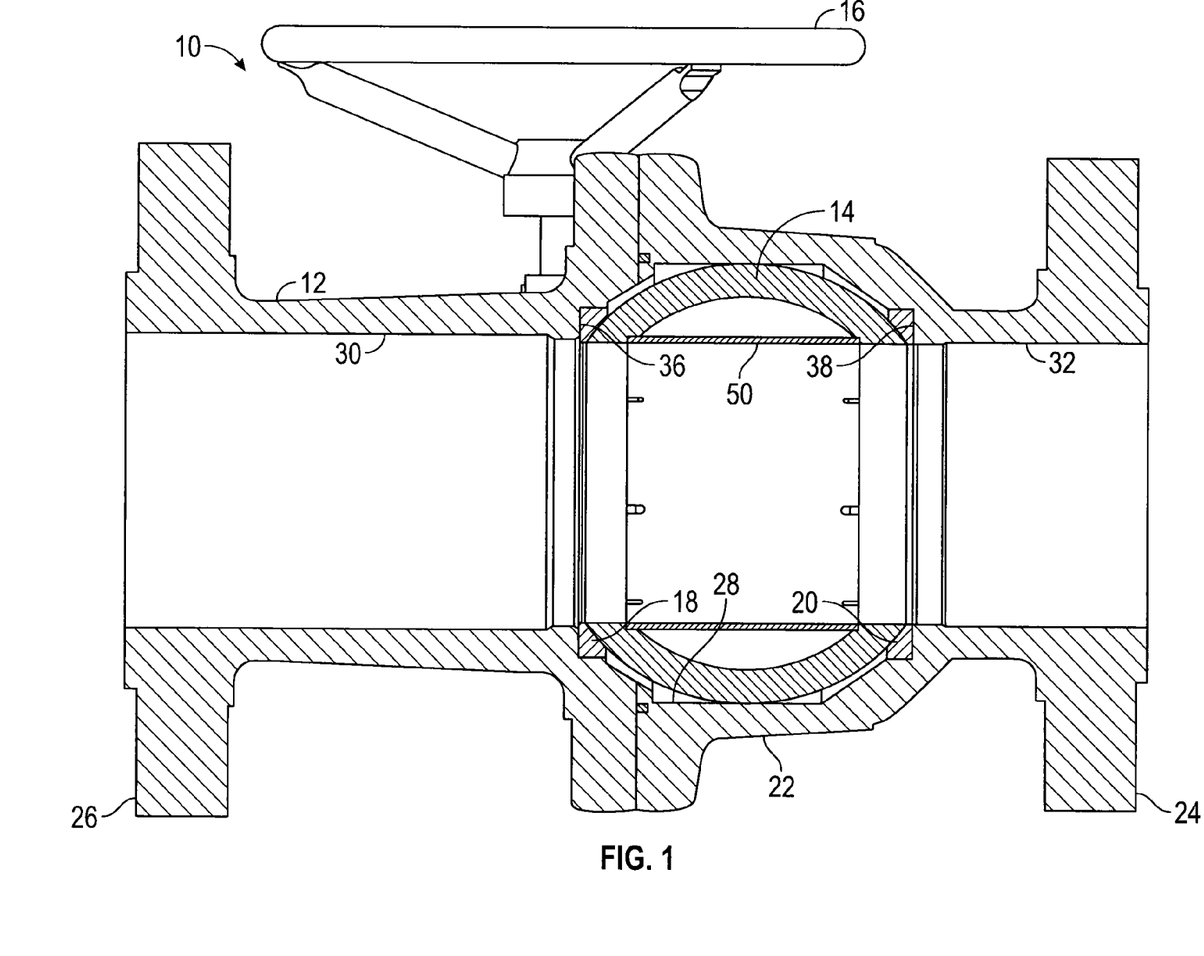
FIG. 1 is a cross sectional view of a floating ball valve constructed in accordance with the inventive concepts disclosed herein.

Referring now to the drawings, and more particularly to FIG. 1, a floating ball valve 10 constructed in accordance with the inventive concepts disclosed herein is illustrated. The floating ball valve 10 includes a body assembly 12, a valve member 14 disposed in the body assembly 12 for rotation between an open position (FIG. 1) and a closed position (not shown), and a stem (not shown) to which a handle 16 is connected for rotating the valve member 14 between the open position and closed position. As well known in the art, various forms of handles and connections may be used, and therefore no further description is believed necessary. The floating ball valve 10 further includes a pair of seats 18 and 20 for forming a seal between the body assembly 12 and the valve member 14.

The body assembly 12, as shown in FIG. 1, includes a body 22, a first end adaptor 24 illustrated as being integrally formed with the body 22 as one piece, and a second end adapter 26 connected to the opposing end of the body 22. It will be appreciated by those of ordinary skill in the art that the body assembly 12 may be fabricated in three portions where each of the end adaptors 24 and 26 are connected to the body 22. Further, the end adapters 24 and 26 may be provided in a variety of forms, such as flanged (e.g., end adapter 24 and 26), welded, and threaded.

The body assembly 12 has a centrally disposed valve chamber 28, and an inlet passage 30 and an outlet passage 32 in communication with the valve chamber 28 to form a flow passageway through the body assembly 12. A first seat pocket 36 is formed about the inlet passage 30, and a second seat pocket 38 is formed about the outlet passage 32. The first seat pocket 36 is adapted to receive the seat 18, and the second seat pocket 38 is adapted to receive the seat 20.

Referring now to FIGS. 1-5, the valve member 14 has a generally spherical shape and is mounted within the valve chamber 28 for rotation about an axis between the open position and the closed position wherein the valve member 14 is rotated substantially 90 degrees from the open position to the closed position. The valve member 14 has a central bore 50 which aligns with the inlet passage 30 and the outlet passage 32 in the open position of the valve member 14 to permit the passage of fluid through the valve 10 when the valve member 14 is in the open position thereof. In the closed position of the valve member 14, the seat assemblies 18 and 20 engage the exterior surface of the valve member 14 and internal surfaces of the body assembly 12 to form fluid tight seals which disrupt fluid communication between the inlet passage 30 and the outlet passage 32. The valve member 14 has an exterior slot 52 (FIGS. 6 and 7 for receiving a distal end of the stem (not shown). The exterior slot 52 is sized with respect to the stem to permit movement of the valve member 14 in an axial direction when the valve member 14 is rotated to the closed position. Thus, the valve member 14 is of the type known in the art as a "floating" valve member or valve ball.

The valve member 14 includes a pair of substantially hemispherical shell components 54a and 54b, fixed together to form a substantially spherical, hollow shell 56, and a sleeve 58 defining the central bore 50. When formed, the shell 56 has an exterior surface 60, an interior surface 62, two opposing annular openings 64a and 64b, an upper end 66, and a lower end 68. The upper end 66 is connectable to the stem for rotating the shell 56 about an axis of rotation extending from the upper end 66 to the lower end 68.

Figure 3:
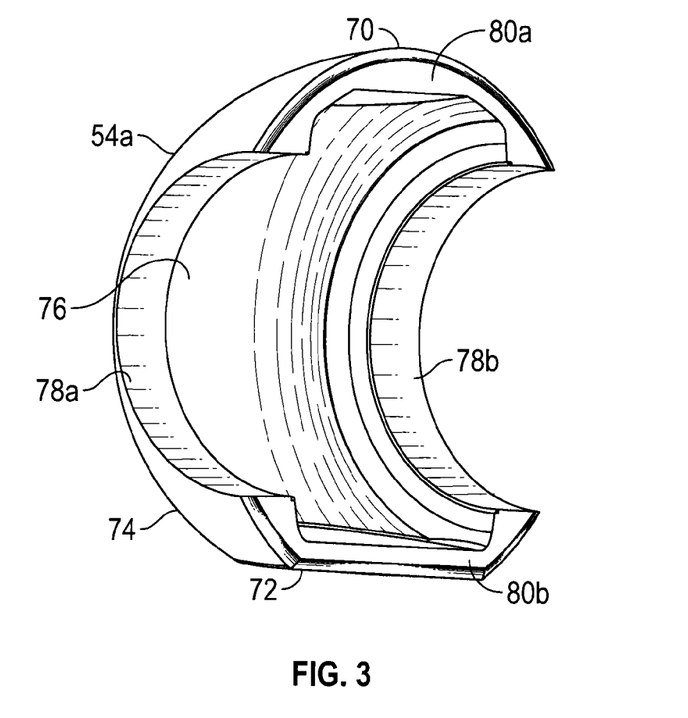
FIG. 3 is a perspective view of a shell component.
Figure 4:
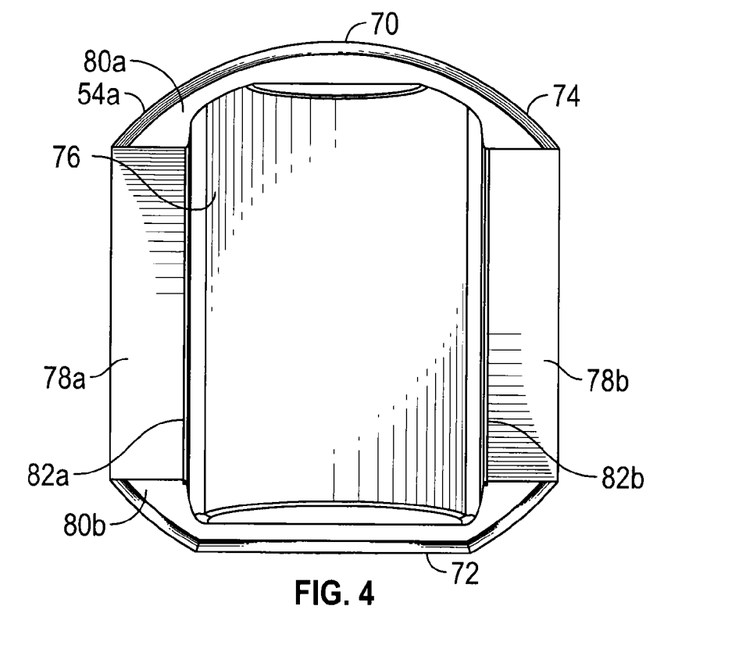
FIG. 4 is an elevational view of the shell component of FIG. 3.
Figure 5:
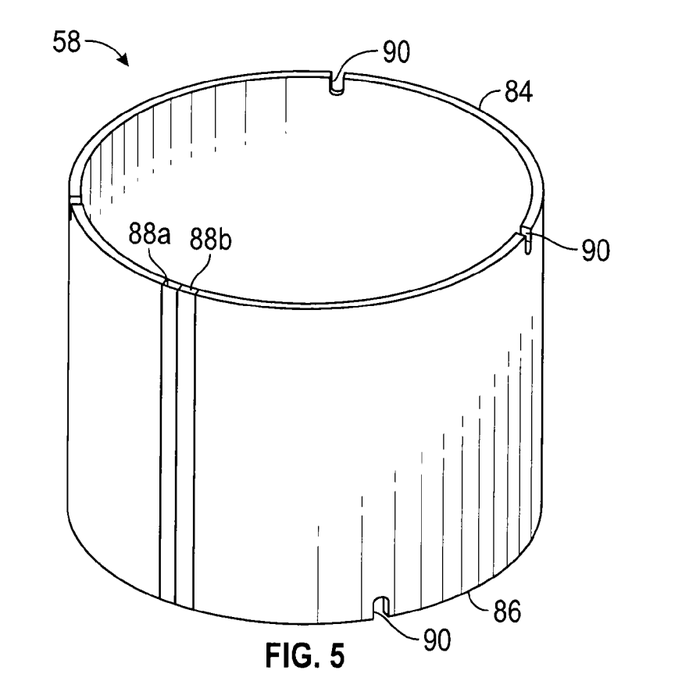
FIG. 5 is a perspective view of a sleeve.

In one embodiment, the hemispherical shell components 54a and 54b are configured such that the hemispherical shell components 54a and 54b are fixed together along a plane in a coplanar relationship with the longitudinal axis of the central bore 50. The hemispherical shell components 54a and 54b are mirror images of one another. As such, only the hemispherical shell component 54a will be described in detail below.

The hemispherical shell component 54a is characterized as having an upper end 70, a lower end 72, a substantially convex exterior surface 74, a substantially concave interior surface 76, a pair of semi-circularly shaped notches 78a and 78b, and a pair of beveled edges 80a and 80b extending between the semi-circularly shaped notches 78a and 78b. The upper end 70 may have a thickness greater than the remainder of the hemispherical shell component 54a and sufficient to accommodate the formation of the slot 52 after assembly of the hemispherical shell component 54a with the hemispherical shell component 54b in a manner to be discussed below. The lower end 72 may be formed to have a flat configuration.

The hemispherical shell component 54a is provided with groove 82a and 82b about the semi-circularly shaped notches 78a and 78b, respectively, on the interior surface 76 for receiving one end of the sleeve 58. The grooves 82a and 82b are provided with a depth to substantially correspond to the thickness of the sleeve 58 so that the sleeve 58 sits substantially flush with the semi-circularly shaped notches 78a and 78b when assembled.

The hemispherical shell components 54a and 54b may be formed using suitable manufacturing techniques to achieve desired functionality. For example, the hemispherical shell components 54a and 54b may be forged or cast of suitable material, e.g., stainless steel; machined or formed to appropriate size, tolerance, smoothness, flatness and other surface finishes; completed to appropriate hardness, flexibility, stiffness, and provided with suitable coatings and fatigue properties/characteristics.

The sleeve 58 (FIG. 5) may be formed of a suitable steel sheet rolled to define a tubular member. The sleeve 58 has a first end 84, a second end 86, and a pair of edges 88a and 88b. The sleeve 58 may be provided with a plurality of notches 90 along the first end 84 and the second end 86 for equalizing pressure.

Figure 2:
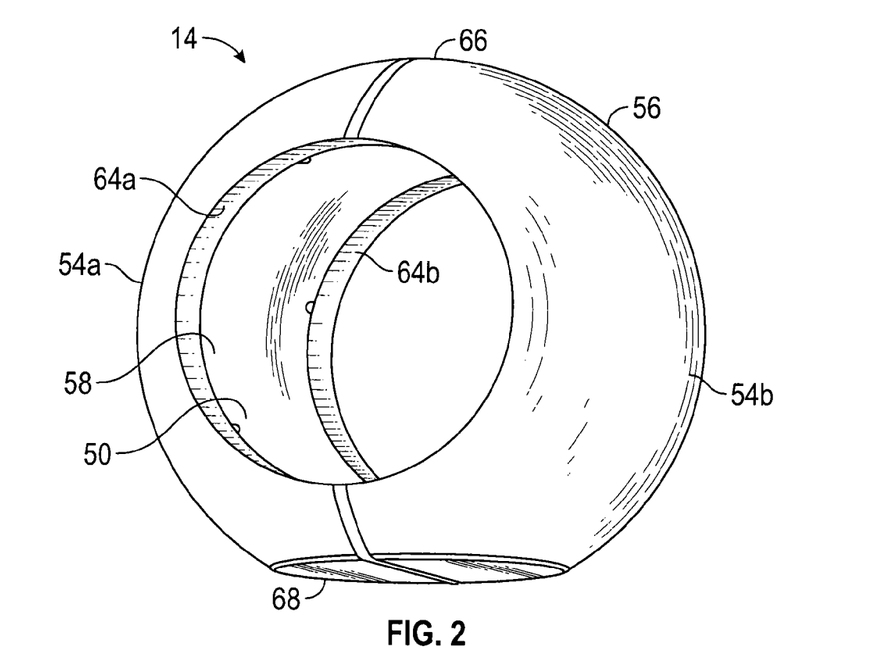
FIG. 2 is a perspective view of a valve member constructed in accordance with the inventive concepts disclosed herein.
Figure 6:
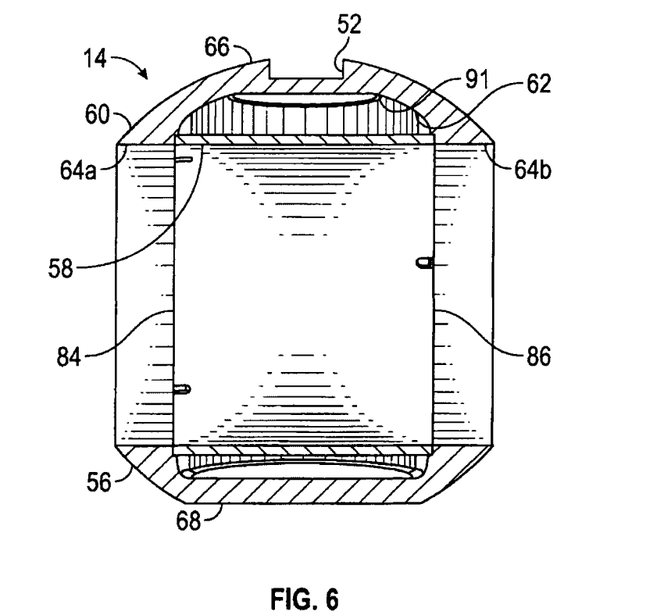
FIG. 6 is a sectional view of the valve member taken along line 6-6 of FIG. 2.
Figure 7:
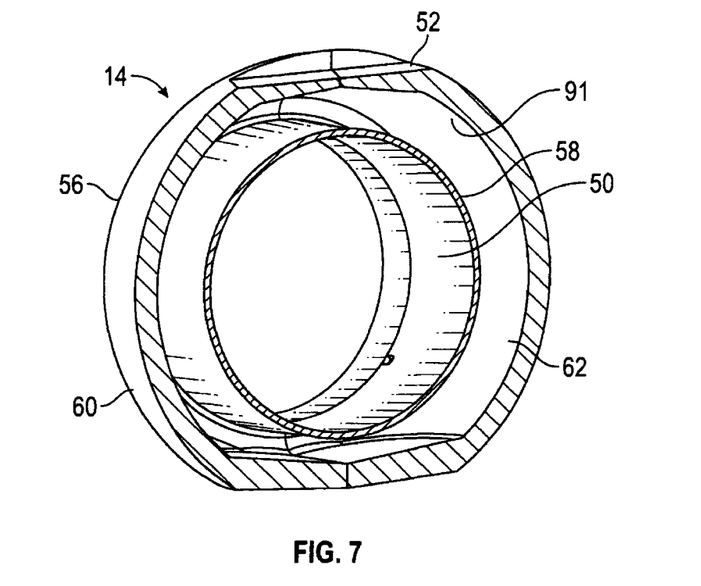
FIG. 7 is sectional view of the valve member taken along line 7-7 of FIG. 2.

To assemble the valve member 14 as shown in FIGS. 2, 6 and 7, the hemispherical shell components 54a and 54b are fixed together by welding along the edges 80a and 80b to form the shell 56. In one embodiment, the edges 80a and 80b are oriented so that the axis of rotation of the shell 56 is perpendicular to the longitudinal axis of the central bore 50 and in a coplanar relationship with the plane along which the hemispherical shell components 54a and 54b are fixed together. As such, the welds are formed away from the sealing area of the valve member 14, thereby reducing cost associated with welding material and rejections due to welding flaws.

The shell 56 may then be machined to smooth and size the annular openings 64a and 64b and form the slot 52. Next, the sleeve 58 may be rolled to provide an overlap of one edge 88a relative to the other edge 88b so that sleeve 58 has a diameter less than the diameter of the annular openings 64a and 64b. The sleeve 58 may then be inserted into the shell 56 and expanded with the edges 88a and 88b adjacent one another and the sleeve 58 positioned between the annular openings 64a and 64b of the shell 56 to define the central bore 50 between the annular openings 64a and 64b. The sleeve 58 is in contact with and fixed to, such as by welding or press fit, the shell 56 solely at the first end 84 and the second end 86 thereof in a way that a continuous, uninterrupted void 91 is defined between the sleeve 58 and the interior surface 62 of the shell 56 from the first end 84 of sleeve 58 to the second end 86 of the sleeve 58, thereby providing a lightweight floating ball valve member.

Figure 8:
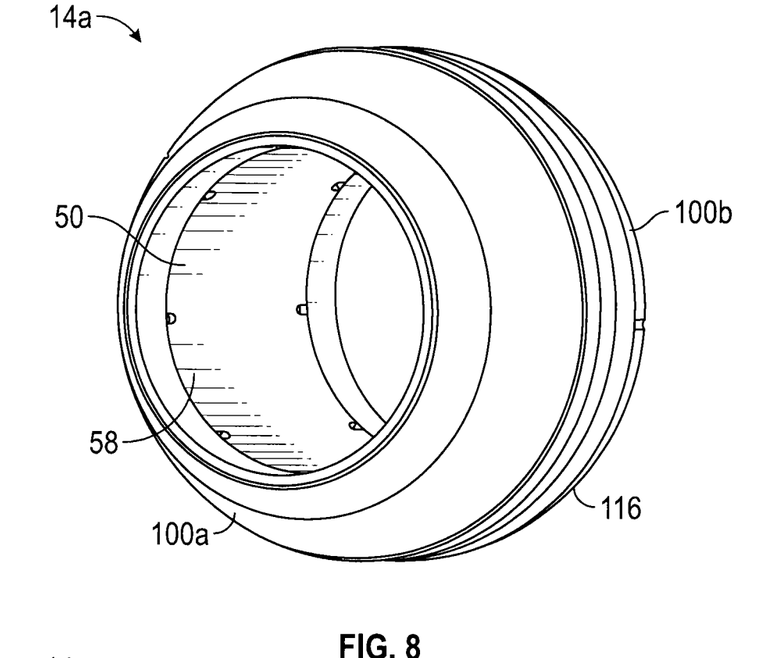
FIG. 8 is a perspective view of another embodiment of a valve member constructed in accordance with the inventive concepts disclosed herein.
Figure 9:
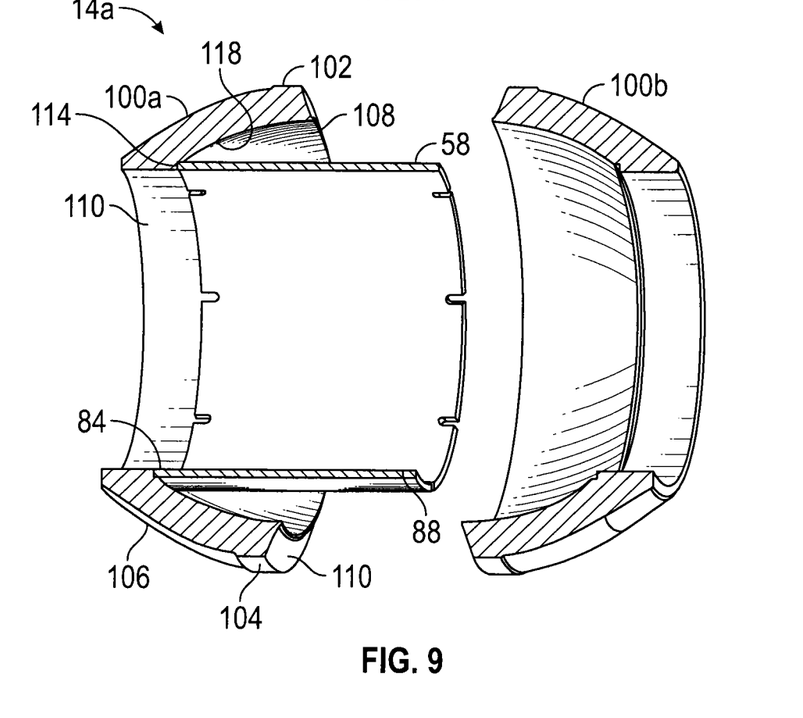
FIG. 9 is an exploded, perspective view of the valve member of FIG. 8.

FIGS. 8 and 9 illustrate another embodiment of a valve member 14a constructed in accordance with inventive concepts disclosed herein. The valve member 14a is similar to the valve member 14 described above except that the valve member 14a includes a pair of hemispherical shell components 100a and 100b configured such that the hemispherical shell components 100a and 100b are fixed together along a plane perpendicular with the longitudinal axis of the central bore 50.

The hemispherical shell components 100a and 100b are mirror images of one another. As such, only the hemispherical shell component 100a will be described in detail below.

The hemispherical shell component 100a is characterized as having an upper end 102, a lower end 104, a substantially convex exterior surface 106, a substantially concave interior surface 108, an annular opening 110, and an annular edge 112 parallel to the annular opening 110. The upper end 102 may have a thickness greater than the remainder of the hemispherical shell component 100a and sufficient to accommodate the formation of a slot like the slot 52 shown in FIGS. 6 and 7, after assembly of the hemispherical shell component 100a with the hemispherical shell component 100b in a manner to be discussed below.

The hemispherical shell component 100a is provided with groove 114 about the annular opening 110 on the interior surface 108 for receiving one end of the sleeve 58. The groove 114 is provided with a depth to substantially correspond to the thickness of the sleeve 58 so that the sleeve 58 sits substantially flush with the annular opening 110 when assembled.

To assemble the valve member 14a, the sleeve 58 with the edges 88a and 88b positioned adjacent one another may positioned between the hemispherical shell components 100a and 100b so as to align the annular opening 110 of the hemispherical shell components 100a with the annular opening 110 of the hemispherical shell components 100b. Like with the valve member 14, the sleeve 58 is in contact with and fixed to, such as by welding or press fit, the shell 116 solely at a first end and the second end thereof in a way that a continuous, uninterrupted void 118 is defined between the sleeve 58 and the interior surface of the shell 116 from the first end 84 of sleeve 58 to the second end 86 of the sleeve 58.

From the above description, it is clear that the present invention is well adapted to carry out the objects and to attain the advantages mentioned herein as well as those inherent in the invention. While exemplary embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. A valve member, comprising:
    a pair of substantially hemispherical shell components fixed together to form a substantially spherical, hollow shell, the shell having an exterior surface, an interior surface, and two opposing annular openings; and
    a sleeve having a first end and a second end, the sleeve positioned between the annular openings of the shell to define a central bore between the annular openings, the sleeve in contact with and fixed to the shell solely at the first end and the second end thereof in a way that a continuous void is defined between the sleeve and the interior surface of the shell from the first end of sleeve to the second end of the sleeve;
    wherein the central bore has a longitudinal axis, and wherein the hemispherical shell components are fixed together along a plane in a coplanar relationship with the longitudinal axis of the central bore; and
    wherein the shell has an upper end and a lower end, the shell being rotatable about an axis of rotation extending from the upper end to the lower end, the axis of rotation being perpendicular to the longitudinal axis of the central bore and in a coplanar relationship with the plane along which the hemispherical shell components are fixed together.

2. The valve member of claim 1, wherein the lower end of the shell forms a substantially flat surface.

3. A valve, comprising:
    a body assembly having a valve chamber and an inlet passage and an outlet passage in communication with the valve chamber;
    a valve member positioned in the valve chamber and movable between an open position and a closed position, the valve member comprising:
        a pair of substantially hemispherical shell components fixed together to form a substantially spherical, hollow shell, the shell having an exterior surface, an interior surface, and two opposing annular openings; and
        a sleeve having a first end and a second end, the sleeve positioned between the annular openings of the shell to define a central bore between the annular passages for providing fluid communication between the inlet passage and the outlet passage when the valve member is in the open position, the sleeve in contact with and fixed to the shell solely at the first end and the second end thereof in a way that a continuous void is defined between the sleeve and the interior surface of the shell from the first end of sleeve to the second end of the sleeve;
        wherein the central bore has a longitudinal axis, and wherein the hemispherical shell components are fixed together along a plane in a coplanar relationship with the longitudinal axis of the central bore; and
        wherein the shell has an upper end and a lower end, the shell being rotatable about an axis of rotation extending from the upper end to the lower end, the axis of rotation being perpendicular to the longitudinal axis of the central bore and in a coplanar relationship with the plane along which the hemispherical shell components are fixed together;
    a first seat extending about the inlet passage and engaging the valve member; and
    a second seat extending about the outlet passage and engaging the valve member.

4. The valve of claim 3, wherein the lower end of the shell forms a substantially flat surface.

5. A method of forming a valve member, comprising:
    fixing a pair of substantially hemispherical shell components together to form a substantially spherical, hollow shell, the shell having an exterior surface, an interior surface, and two opposing annular openings; and positioning a sleeve having a first end and a second end between the annular openings of the shell to define a central bore between the annular openings so that the sleeve is in contact with and fixed to the shell solely at the first end and the second end thereof in a way that a continuous void is defined between the sleeve and the interior surface of the shell from the first end of sleeve to the second end of the sleeve, wherein the central bore has a longitudinal axis, and wherein the hemispherical shell components are fixed together along a plane in a coplanar relationship with the longitudinal axis of the central bore, and wherein the shell has an upper end and a lower end, the shell being rotatable about an axis of rotation extending from the upper end to the lower end, and wherein the hemispherical shell components are fixed together so that the axis of rotation is perpendicular to the longitudinal axis of the central bore and in a coplanar relationship with the plane along which the hemispherical shell components are fixed together.

\* \* \* \* \*